US008548727B2

(12) United States Patent
Kauffman et al.

(10) Patent No.: US 8,548,727 B2

(45) Date of Patent: Oct. 1, 2013

(54) COGNITIVE AIRCRAFT HAZARD ADVISORY SYSTEM (CAHAS)

(75) Inventors: Donald C. Kauffman, Laurel, MD (US); Michael Christian Dorneich, St. Paul, MN (US)

(73) Assignee: Honeywell International Inc., Morrristown, NJ (US)

( * ) Notice: Subject to any disclaimer, the term of this patent is extended or adjusted under 35 U.S.C. 154(b) by 690 days.

(21) Appl. No.: 12/323,350

(22) Filed: Nov. 25, 2008

(65) Prior Publication Data

US 2009/0276149 A1 Nov. 5, 2009

Related U.S. Application Data

(60) Provisional application No. 61/050,190, filed on May 2, 2008.

(51) Int. Cl.
*G06F 19/00* (2011.01)
*G08G 5/04* (2006.01)

(52) U.S. Cl.
USPC ............ 701/301; 340/961; 340/963; 340/964

(58) Field of Classification Search
USPC ................. 701/1, 3, 300, 301, 120, 200, 8, 9, 701/302; 340/945, 961, 963, 951, 968, 973, 340/902, 964; 180/167
See application file for complete search history.

(56) References Cited

U.S. PATENT DOCUMENTS

| | | | | |
|---|---|---|---|---|
| 5,724,040 | A * | 3/1998 | Watnick | 342/26 D |
| 6,002,347 | A | 12/1999 | Daly et al. | |
| 6,127,944 | A | 10/2000 | Daly et al. | |
| 6,201,482 | B1 * | 3/2001 | Schiefele et al. | 340/961 |
| 6,271,768 | B1 * | 8/2001 | Frazier et al. | 340/961 |
| 6,370,475 | B1 * | 4/2002 | Breed et al. | 701/301 |
| 7,587,764 | B2 * | 9/2009 | Cox | 726/23 |
| 2002/0011950 | A1 * | 1/2002 | Frazier et al. | 342/357.08 |
| 2003/0132860 | A1 * | 7/2003 | Feyereisen et al. | 340/973 |
| 2003/0222795 | A1 * | 12/2003 | Holforty et al. | 340/968 |
| 2006/0241820 | A1 * | 10/2006 | Dwyer et al. | 701/3 |

FOREIGN PATENT DOCUMENTS

| | | | |
|---|---|---|---|
| EP | 0964381 | A2 | 12/1999 |
| WO | 9740401 | A1 | 10/1997 |

* cited by examiner

*Primary Examiner* — Ronnie Mancho
(74) *Attorney, Agent, or Firm* — Shumaker & Sieffert, P.A.

(57) ABSTRACT

Integrated surveillance systems and methods for processing multiple sensor inputs and determining a best route for avoiding multiple hazards. An example method performed on a first aircraft includes generating a plurality of routes for avoiding a previously determined alert from a first advisory system. Then, probability of success information is generated at other advisory systems for each of the plurality of routes. The best route of the plurality of routes is determined based on the generated probabilities and output to the flight crew or other aircraft. The probability of success information includes a previously defined uncertainty value. The uncertainty value corresponds to quality of data provided to or provided by the respective advisory system.

12 Claims, 4 Drawing Sheets

COGNITIVE AIRCRAFT HAZARD ADVISORY SYSTEM (CAHAS)

PRIORITY CLAIM

This application claims the benefit of U.S. Provisional Application Ser. No. 61/050,190 filed May 2, 2008, the contents of which are hereby incorporated by reference.

BACKGROUND OF THE INVENTION

Maintaining or increasing current levels of aviation safety with tripled capacity and traffic flow is a daunting task. Supporting pilots' awareness and ability to respond accurately and quickly to potential hazards is a critical element to acceptable future safety levels. Yet pilots' task and information loading in the emerging US Next Generation (NextGen) and Single European Sky Air Traffic Management Research (SESAR) environments could significantly increase, leading to increased potential for errors and increased safety risks rather than the hoped for decreases.

Existing aircraft advisory systems issue advisories independently of advisories of other aircraft advisory systems. For example a Traffic Collision and Avoidance System (TCAS) system may issue an advisory to "descend, descend." However, if the aircraft is flying close to terrain, the Enhanced Ground Proximity Warning System (EGPWS) system issues an advisory "terrain, terrain", "pull up, pull up" Just such incidents were reported to the NASA Aviation Safety and Reporting System (ASRS). In this time-critical, stressful situation, the pilots had to decide on their own which alert would take precedence and the appropriate action to take. Indeed this decision was made even more difficult by the blaring audio alerts. Each system was designed with its own goals and objectives. Since the systems are separate and independent they do not have a common framework to share intent. The pilots were left on their own to de-conflict the alerts.

SUMMARY OF THE INVENTION

The present invention provides integrated surveillance systems and methods for processing multiple sensor inputs and determining a best route for avoiding multiple hazards.

An example method performed on a first aircraft includes generating a plurality of routes for avoiding a previously determined alert from a first advisory system. Then, probability of success information is generated at other advisory systems for each of the plurality of routes. The best route of the plurality of routes is determined based on the generated probabilities and output to the flight crew or other aircraft.

In one aspect of the invention, the generation of routes are based on information received from one of a Flight Management System (FMS) or a Flight Control System (FC).

In another aspect of the invention, the probability of success information includes a previously defined uncertainty value. The uncertainty value corresponds to quality of data provided to or provided by the respective advisory system.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
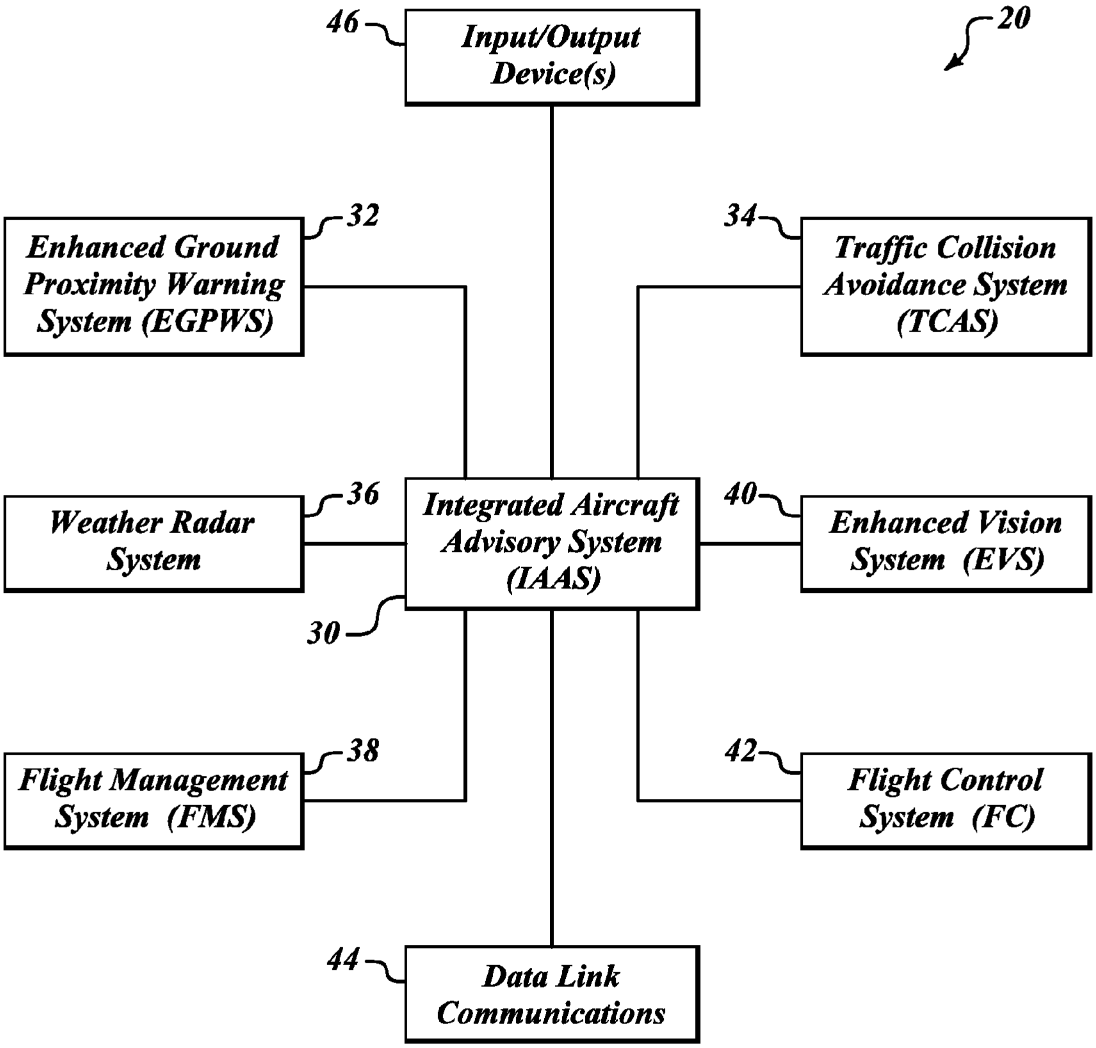
FIG. 1 is a block diagram of an example system formed in accordance with an embodiment of the present invention.

The present invention is an integrated surveillance system that processes multiple sensor inputs, e.g. Traffic Alert Collision Avoidance System (TCAS), Enhanced Ground Proximity Warning System (EGPWS), Weather Radar, Automatic Dependent Surveillance-Broadcast (ADS-B) In System and inputs from other aircraft systems, i.e., Flight Management System (FMS)/Flight Control System (FC). The reason for the FMS/FC input is to determine the aircraft state, speed, attitude, flap settings, etc, which could impact the responsiveness of the aircraft to execute a certain maneuver, e.g. it might be hard to perform a speed up advisory if the flaps are extended. One of the key features of this new cognitive function is the analysis of a probability of outcome tree. If it is 100% certain that you will hit the ground if you descend and 100% certain that you will collide with traffic if you climb, but 100% certain that you will avoid terrain and only 50% certain that you will collide with the traffic if you pull up and right and speed up, the system would recommend the 50% solution. The system checks the probability of safe outcome for all possible combinations of maneuvers and recommends the combination with the highest probability of a safe outcome.

It is also possible that one or more of the advisories will have deterministic uncertainty. For example, the position of another aircraft reported by the ADS-B In system may have uncertainties based on the navigation signals used by the reporting aircraft and the latency of the data. Therefore, in addition to knowing the mean probability that a particular advisory action, e.g. heading change, will result in a safe outcome, there will be an uncertainty or variance in the probability as well. The TCAS system has a known bearing uncertainty relative to the heading of the subject aircraft. Therefore, the probability of having a safe outcome from a hazardous situation based on a particular advisory, e.g. new heading, will have a corresponding uncertainty or variance. The cognitive function performed by the system would also take the uncertainty or variability into account in addition to the mean probability. An example would be as follows. If the TCAS system advised that another aircraft was approaching from a relative bearing 15 degrees left of heading and the TCAS bearing uncertainty was 5 degrees, the advisory would include a no fly zone from 10 degrees to 20 degrees to the left of heading.

In one embodiment, uncertainty or variance is a constant for data from a particular system. In another embodiment uncertainty or variance is formed from a combination of factors. For example, if the GPS receiver is not working or receiving adequate signals, the position of the aircraft may be know with less certainty. This coupled with uncertainty or variability in the TCAS bearing accuracy would result in a different variance than due to the TCAS uncertainty alone if the GPS receiver were working perfectly.

In another embodiment, the present invention exchanges advisories and aircraft state information between aircraft, e.g. if one aircraft cannot dive because of terrain perhaps the two aircraft can execute a coordinated maneuver that has a higher probability of success than two individual, self optimized maneuver advisories.

In another embodiment, the present invention utilizes information about the aircraft involved in the hazardous situation from other external systems, such as ground based or satellite based surveillance systems. These other systems may have a different perspective on the hazardous situation than would result in a safer outcome when considered with the on-board sources of data. The ground or satellite based systems would provide aircraft traffic or weather hazard information to the aircraft to integrate into the integrated surveillance system calculations.

The benefit of this invention is that it analyzes the impact of an advisory from one system (internal and/or external) that would result from that advisory from other hazard systems' perspectives.

In one embodiment, a cognitive advisory function is added to an integrated surveillance systems (ISS) or added as an integrating function in aircraft with federated surveillance systems. This function allows the ISS to monitor surveillance systems for hazardous situations and calculate the probability (mean and variance) of successful evasion of hazards and the margins of safety based on inputs from various sensor systems such as TCAS, EGPWS, weather radar, and enhanced vision systems. Additionally, the probability of successful outcome can be improved by considering aircraft state and dynamics information from the FMS and/or FCS. These inputs will enable the ISS to predict the probability of the aircraft to execute candidate evasive maneuvers, thereby adding to the fidelity of the resultant advisory to the pilot. Information from other aircraft involved in the hazardous situation and from other sources such as ground based and satellite based surveillance systems can be added to the cognitive advisory function.

Note that this cognitive function can be implemented by the use of other mathematical or geometrical methods other than the mean and variance of the probability of a successful outcome. Similar benefits are realized by exchanging three dimensional "keep out" zones, which would describe the hazardous volumes identified by a particular sensor. By fusing all of these hazardous volumes and factoring in the aircraft state and performance information, the cognitive function determines the best path through the hazards. The fundamental innovation of this invention is the cognitive integration of dissimilar surveillance and other aircraft systems (whether on the subject aircraft, other aircraft, ground based and/or satellite based systems).

In one embodiment, as shown in FIG. 1, a system 20 on an aircraft includes an Integrated Aircraft Advisory System (IAAS) 30 that receives output from multiple sensor inputs (a TCAS 34, an EGPWS 32, a Weather Radar 36, an FMS 38, an FC 42, an Enhanced Vision System (EVS) 40, and/or external sources via a data link communications 44 then calculates a maneuver for the aircraft and outputs the calculated maneuver to the flight crew via an input/output device(s) 46. Example input/output devices 46 include speakers, headsets, displays, warning lights, etc. The IAAS 30 performs an analysis of a probability of an outcome for two or more evasive maneuvers. The data links communications 44 could be one of many different types of data links, such as data links typically used for surveillance purposes (ADS-B IN, TIS-B (Traffic Information System-IN)) or data links traditionally used for data communications (ACARS (Aircraft Communications Addressing and Reporting System) and VDLM2 (VHF Data Link Mode 2)).

In another embodiment, the IAAS 30 exchanges advisories and aircraft state information with other aircraft via the data link communications 44. If a first aircraft cannot descend because of terrain, the first aircraft and a proximate second aircraft can execute a coordinated maneuver that has a higher probability of success than two individual, self optimized maneuver advisories.

Develop an Integrated Pilot Alerting and Notification Concept

The present invention is an Integrated Alerting and Notification (IAN) adaptive information management system that will be able to account for user's current cognitive capacity to receive, understand, and integrate information, and be able to determine the user's level of interpretability as new alerting and notification information becomes available. The IAAS 30 intelligently manages the information flow to the pilot in order to maximize information throughput and situation awareness while minimizing the cognitive overhead imposed by information management.

The IAAS 30 performs the integration of many different types of sensor and detection systems into a coherent and coordinated set of displays and controls that provide unprecedented assistance to the pilot. The areas of technology required for the creation of IAN are:

Hazard Detection—sensor based hazard warnings that rely on radar, lidar, vision systems such as Forward Looking Infrared Radar (FLIR), temperature sensors, and other aircraft based sensing systems.

Hazard Determination—processing based warnings that are derived from database information, such as the EGPWS where GPS and radar altimeter information are correlated to a terrain database to warn pilots of upcoming terrain features; the provision of offboard sensor information such as ADS-B information from other aircraft in the area; or provision of weather or other data obtained from ground based sensors.

Communications—the transmission of information to the aircraft from other aircraft or the ground to provide ADS-B, terrain update, weather information updates, or other data that would assist in navigation, hazard avoidance, or flight efficiency.

Sensors and Database Fusion—where sensors may be combined, or sensors and databases may be combined, to yield not only a single view of the operational space, but will permit the derivation of additional data not available in the individual components.

Hazard Assessment and Deconfliction—where the information from all sensors and sources is combined, prioritized, and presented in order of most important and/or most cogent.

Integrated Alerts, Notifications, and Information Displays—the presentation of relevant external awareness information relevant to hazard avoidance and strategic planning, presented in a manner that blends easily with other cockpit information.

Methods, Modeling, and Metrics—the ability to objectively assess the performance of similar but varied concepts that address the problem space.

Figure 2:
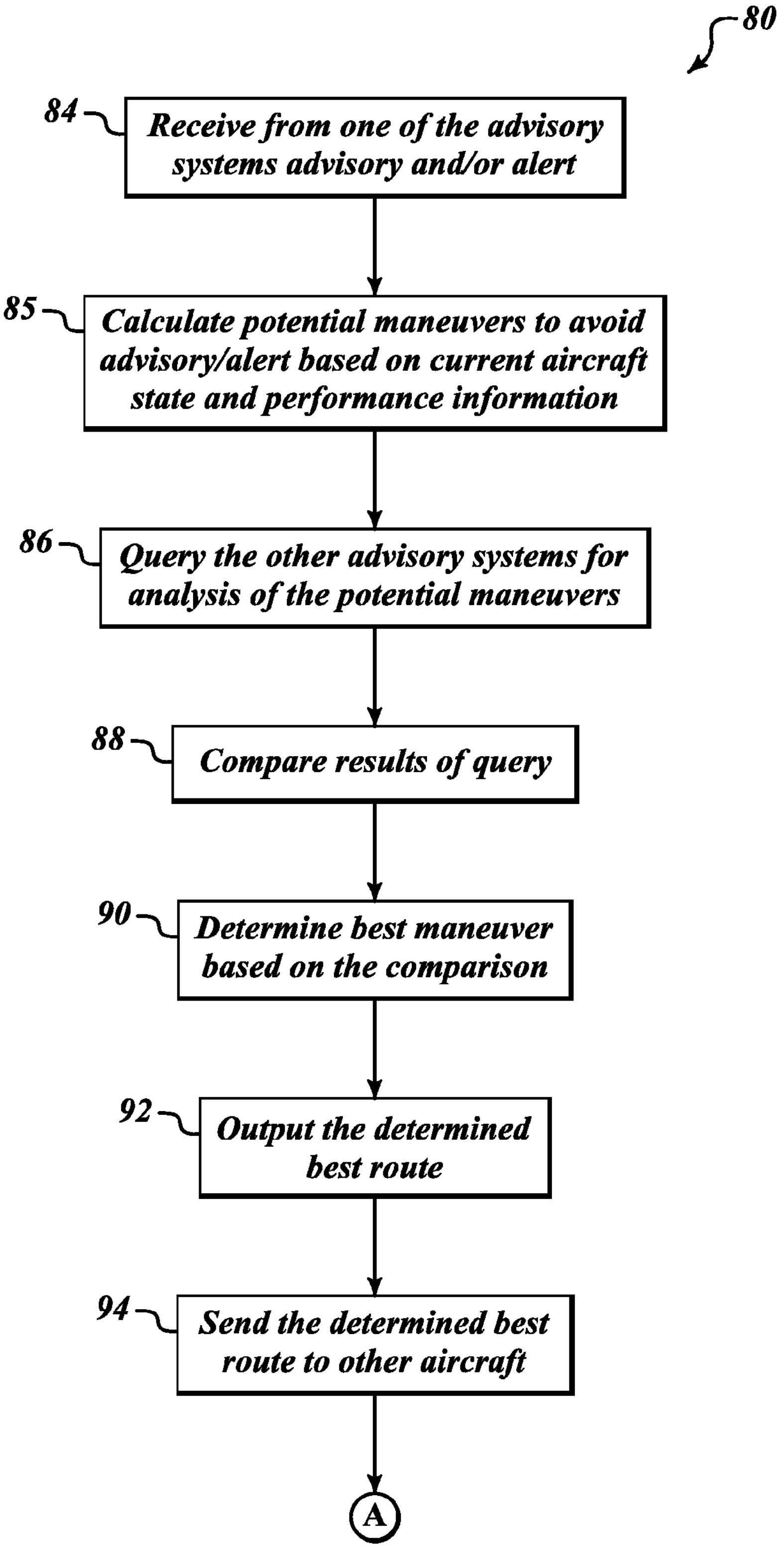
FIGS. 2 and 3 are flow diagrams of example processes performed by the system shown in FIG. 1.
Figure 3:
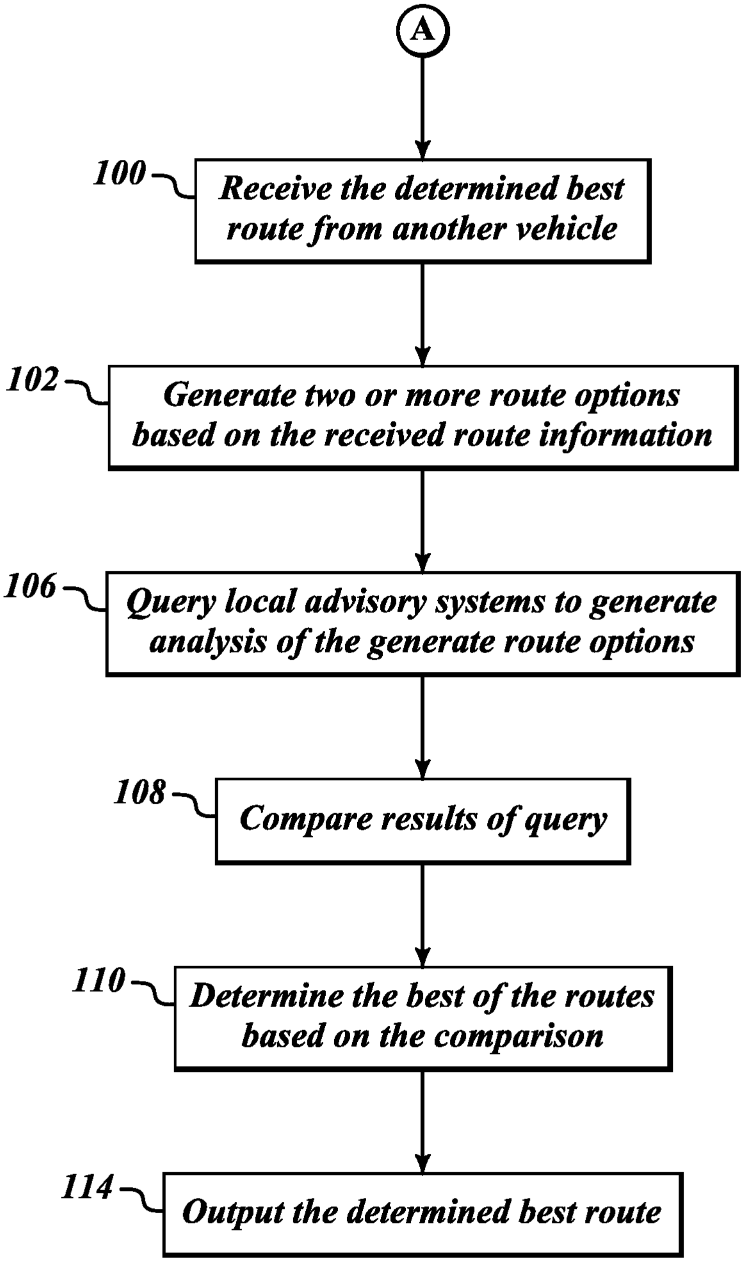
Figure 4:
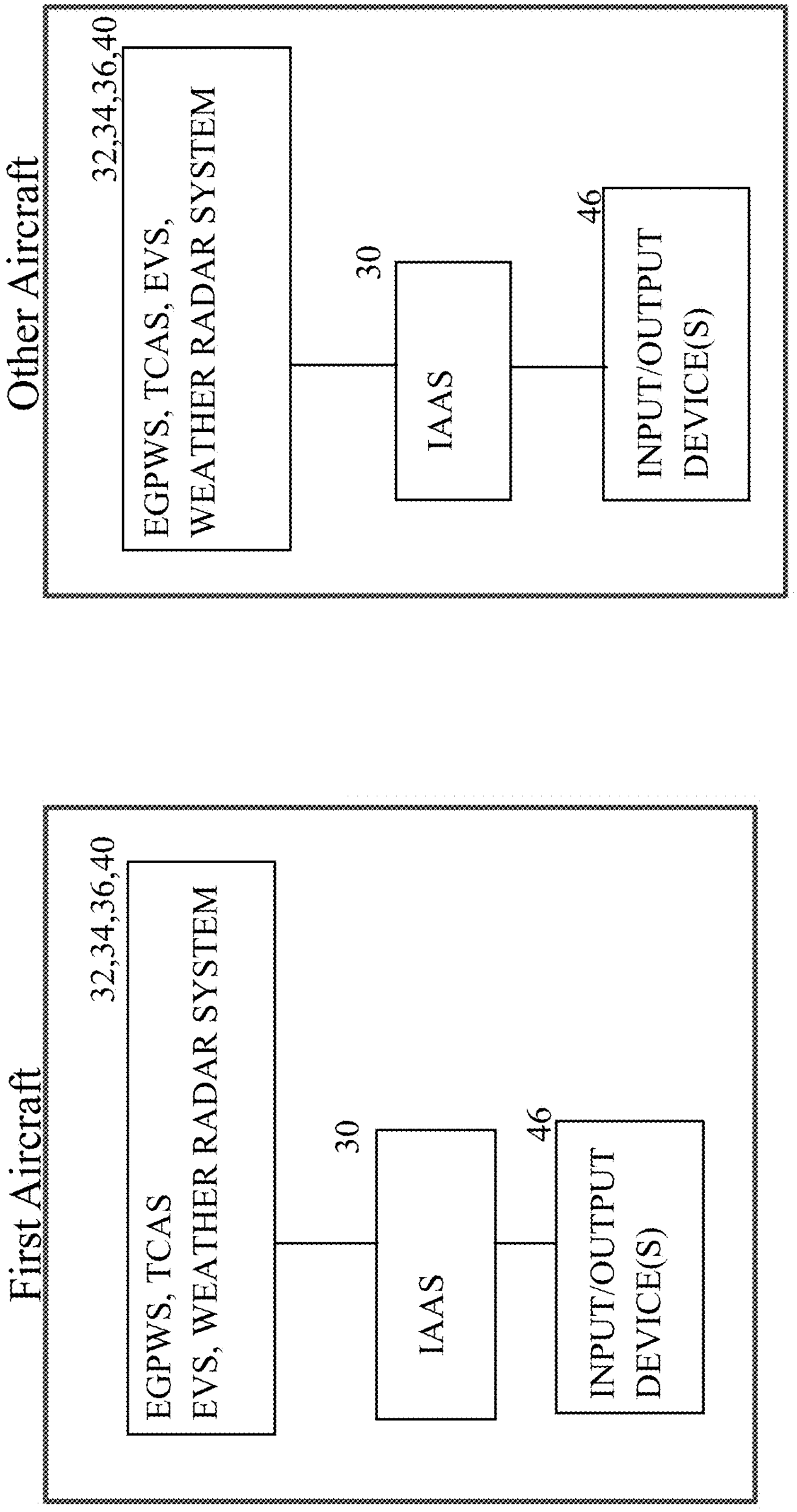
FIG. 4 shows processes performed by an example system.

FIGS. 2 and 3 illustrate an example process 80 performed by the system 20 shown in FIG. 1. First, at a block 84, the IAAS 30 receives an advisory or an alert from one of the advisory systems (32, 34, 36, or 40). Next, at a block 85, either one of the advisory systems or the IAAS 30 calculates potential maneuvers to avoid the determined threat included within the advisory/alert based on current aircraft state and performance information received from the FMS 38 and/or the FC 42. At a block 86, the IAAS queries the other advisory systems that did not produce the received advisory and/or alert. The query requests that those other advisory systems analyze the calculated potential maneuvers to determine a probability of success using any predefined uncertainty (variance) information. Next, at a block 88, the results of the query are sent to the IAAS 30 which compares the results. At a block 90, the IAAS 30 determines the best maneuver based on the performed comparison. At a block 92, the IAAS 30 outputs the determined best result to the input/output devices 46 and/or sends it to other vehicles or aircraft via the data link communications 44 (block 94).

In one embodiment, the query request is sent to systems external to the aircraft, such as other aircraft or ground or satellite-based systems. The other aircraft determines maneuvers in response to potential maneuvers received and then analyzes the determined maneuvers in a similar manner as described in blocks 86-90. The determined best (or two or more best) maneuvers are returned to the aircraft having begun the original query. This interactive analysis may occur a few times until all the aircraft have agreed upon the best maneuvers for all.

FIG. 3 illustrates a process 98 that another aircraft would perform upon receiving a best route determination received from a proximate vehicle. At a block 100, the other aircraft receives the determined best route information from proximate vehicle. At a block 102, a system aboard the other vehicle generates two or more route options for avoiding the other aircraft based on the received route information. At a block 106, an IAAS 30 of the other aircraft queries its resident advisory systems to perform an analysis of the generated two or more route options. At a block 108, the IAAS 30 of the other aircraft compares the results of the query. At a block 110, the IAAS determines the best of the generated two or more routes based on the performed comparison and at a block 114 outputs the determined best route to the input/output device 46 of the other aircraft.

On a first aircraft, generating a plurality of routes for avoiding a previously determined alert from a first advisory system (32, 34, 36, or 40); generating probability of safe outcome of flight information at other advisory systems for each of the plurality of routes; determining a best route of the plurality of routes based on the generated probabilities of safe outcome of flight; outputting the determined best route, wherein outputting comprises outputting the determined best route to at least one other aircraft. On the at least one other aircraft, generating a plurality of routes based on the outputted best route at a first advisory system (32, 34, 36, or 40); generating probability of safe outcome from a hazardous situation at local advisory systems for each of the plurality of routes; at an integrated advisory system (30) determining the best route of the plurality of routes based on the generated probabilities; and at an output device (46) outputting the determined best route.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or priviledge is claimed are defined as follows:

1. A method comprising:
on a first aircraft,
at a plurality of advisory systems, generating a plurality of routes for avoiding a previously determined alert;
at a processing device, generating probability of safe outcome from a hazardous situation for each of the plurality of routes; and
at the processing device, determining a best route of the plurality of routes based on the generated probabilities of safe outcome from a hazardous situation;
at an output device outputting the determined best route, wherein outputting comprises outputting the determined best route to at least one other aircraft,
on the at least one other aircraft,
at a processing device,
generating a plurality of routes based on the outputted best route;
generating probability of safe outcome at local advisory systems for each of the plurality of routes; and
determining the best route of the plurality of routes based on the generated probabilities; and
at an output device outputting the determined best route.

2. The method of claim 1, wherein the previously determined alert is from a first advisory system, and wherein the probability of safe outcome of flight information comprises a previously defined uncertainty value, wherein the uncertainty value corresponds to accuracy of at least one of data provided to or provided by the respective one of the first or other advisory systems.

3. The method of claim 1, wherein generating the plurality of routes is based on information received from one of a Flight Management System (FMS) or a Flight Control System (FC).

4. The method of claim 1, further comprising at the processing device of the first aircraft receiving at least one of aircraft traffic or weather hazard information from at least one of ground or satellite-based systems, wherein generating the plurality of routes is based on the received at least one of aircraft traffic or weather hazard information.

5. The method of claim 1, wherein the plurality of advisory systems are selected from the group consisting of: a Traffic Alert Collision Avoidance System (TCAS), an Enhanced Ground Proximity Warning System (EGPWS), a Weather Radar, and an Automatic Dependent Surveillance-Broadcast (ADS-B) In System.

6. The method of claim 1, wherein the plurality of advisory systems are three or more of a Traffic Alert Collision Avoidance System (TCAS), an Enhanced Ground Proximity Warning System (EGPWS), a Weather Radar, an Automatic Dependent Surveillance-Broadcast (ADS-B) In System.

7. A system comprising:
on a first aircraft,
a first advisory system configured to generate a plurality of routes for avoiding a previously determined alert based on the generated flight information;
at least one other advisory system configured to generate probability of safe outcome from a hazardous situation for each of the plurality of routes; and
a component configured to determine a best route of the plurality of routes based on the generated probabilities of safe outcome from a hazardous situation and output the determined best route, wherein the component outputs the determined best route to other aircraft,
on the other aircraft,
a first component configured to generate a plurality of routes based on the outputted best route from the first aircraft;
one or more advisory systems configured to generate probability of safe outcome from a hazardous situation for each of the plurality of routes; and
a second component configured to determine a best route of the plurality of routes based on the generated probabilities and output the determined best route.

8. The system of claim 7, wherein the probability of safe outcome of flight information comprises a previously defined uncertainty value, wherein the uncertainty value corresponds to accuracy of at least one of data provided to or provided by the respective one of the first or other advisory systems.

9. The system of claim 7, wherein the first aircraft further comprises at least one of a Flight Management System (FMS)

or a Flight Control System (FC) for generating the flight information, wherein the first advisory system generates the plurality of routes based on the generated flight information.

10. The system of claim 7, wherein the first aircraft further comprises a component configured to receive at least one of aircraft traffic or weather hazard information from at least one of ground or satellite-based systems, wherein the first advisory system generates the plurality of routes based on the received at least one of aircraft traffic or weather hazard information.

11. The system of claim 7, wherein the first and the at least one other advisory system are selected from the group consisting of: a Traffic Alert Collision Avoidance System (TCAS), an Enhanced Ground Proximity Warning System (EGPWS), a Weather Radar, and an Automatic Dependent Surveillance-Broadcast (ADS-B) In System.

12. The system of claim 7, wherein the first and the at least one other advisory system are three or more of a Traffic Alert Collision Avoidance System (TCAS), an Enhanced Ground Proximity Warning System (EGPWS), a Weather Radar, an Automatic Dependent Surveillance-Broadcast (ADS-B) In System.

* * * * *

UNITED STATES PATENT AND TRADEMARK OFFICE

CERTIFICATE OF CORRECTION

PATENT NO. : 8,548,727 B2
APPLICATION NO. : 12/323350
DATED : October 1, 2013
INVENTOR(S) : Donald C. Kauffman et al.

It is certified that error appears in the above-identified patent and that said Letters Patent is hereby corrected as shown below:

In the Claims

Claim 7, column 6, line 41: “based on the generated flight” should be changed to --based on generated flight--

Signed and Sealed this
Eighteenth Day of March, 2014

Michelle K. Lee
*Deputy Director of the United States Patent and Trademark Office*

UNITED STATES PATENT AND TRADEMARK OFFICE

CERTIFICATE OF CORRECTION

PATENT NO. : 8,548,727 B2
APPLICATION NO. : 12/323350
DATED : October 1, 2013
INVENTOR(S) : Kauffman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 864 days.

Signed and Sealed this
Third Day of March, 2015

Michelle K. Lee

Michelle K. Lee
*Deputy Director of the United States Patent and Trademark Office*